United States Patent
Bunner

(10) Patent No.: US 10,142,699 B2
(45) Date of Patent: Nov. 27, 2018

(54) SYSTEMS AND METHODS FOR PROVIDING INTERACTIVE CONTENT

(71) Applicant: Google LLC, Mountain View, CA (US)

(72) Inventor: Andrew Ames Bunner, Belmont, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/074,274

(22) Filed: Mar. 18, 2016

(65) Prior Publication Data
US 2017/0272824 A1    Sep. 21, 2017

(51) Int. Cl.
*H04N 21/4725* (2011.01)
*H04N 21/482* (2011.01)
*H04N 21/41* (2011.01)
*H04N 21/81* (2011.01)
*H04N 21/858* (2011.01)
*H04W 8/00* (2009.01)
*H04N 21/431* (2011.01)
(Continued)

(52) U.S. Cl.
CPC ....... *H04N 21/482* (2013.01); *H04N 21/4126* (2013.01); *H04N 21/431* (2013.01); *H04N 21/436* (2013.01); *H04N 21/4722* (2013.01); *H04N 21/818* (2013.01); *H04N 21/8586* (2013.01); *H04W 8/005* (2013.01); *H04W 76/14* (2018.02)

(58) Field of Classification Search
None
See application file for complete search history.

(56) References Cited

U.S. PATENT DOCUMENTS

| | | |
|---|---|---|
| 8,249,925 B2 | 8/2012 | Broms et al. |
| 2004/0068744 A1 | 4/2004 | Claussen et al. |

(Continued)

FOREIGN PATENT DOCUMENTS

| | | |
|---|---|---|
| GB | 2 370 945 | 7/2002 |
| JP | 2014-204157 | 10/2014 |

(Continued)

OTHER PUBLICATIONS

International Search Report and Written Opinion for Application No. PCT/US2017/022351, dated Jun. 14, 2017.

*Primary Examiner* — Pankaj Kumar
*Assistant Examiner* — Charles N Hicks
(74) *Attorney, Agent, or Firm* — Foley & Lardner LLP

(57) ABSTRACT

Interactive content may be provided by a smart television or other media device using a wireless communication protocol to detect the presence or proximity of a mobile device. When a mobile device is detected, the media device can establish a communication link with the mobile device via the wireless communication protocol. When content is displayed by the media device, additional data can be sent to the mobile device to enhance the user experience via the communication link. The user can interact with the data sent to the mobile device or with the content itself by providing feedback on the mobile device. The feedback may be provided to a content server via a second communication link, such as a cellular link or wireless link to the Internet. In some implementations, content server may modify content for display on the media device based on feedback on the mobile device.

20 Claims, 4 Drawing Sheets

(51) Int. Cl.
  *H04N 21/436*  (2011.01)
  *H04N 21/4722*  (2011.01)
  *H04W 76/14*  (2018.01)

(56) References Cited

U.S. PATENT DOCUMENTS

| | | | |
|---|---|---|---|
| 2009/0150553 | A1 | 6/2009 | Collart et al. |
| 2010/0205628 | A1 | 8/2010 | Davis et al. |
| 2011/0320300 | A1 | 12/2011 | Broms et al. |
| 2013/0090106 | A1 | 4/2013 | Mathews |
| 2014/0028921 | A1* | 1/2014 | Moon ................ H04N 21/4126 348/734 |
| 2014/0047072 | A1* | 2/2014 | Shuster ............... H04L 65/4069 709/219 |
| 2015/0077224 | A1* | 3/2015 | Pal .......................... G06F 21/35 340/5.61 |
| 2015/0120450 | A1 | 4/2015 | Tinkler |
| 2015/0181311 | A1* | 6/2015 | Navin ................ H04N 21/812 725/34 |
| 2015/0245081 | A1* | 8/2015 | Cook ................ H04N 21/2407 725/81 |

FOREIGN PATENT DOCUMENTS

| | | |
|---|---|---|
| WO | WO-2006/094492 | 9/2006 |
| WO | WO-2012/162425 A2 | 11/2012 |
| WO | WO-2014/144760 A1 | 9/2014 |

\* cited by examiner

SYSTEMS AND METHODS FOR PROVIDING INTERACTIVE CONTENT

BACKGROUND

User interaction with broadcast or network-delivered content, such as television programming and advertising, may be limited. For example, systems where a television and smartphone communicate with each other generally do so using infrared technology for control of television functions or through network connections by both the television and the smartphone, such as for control over channel and volume of the television, or for audience measurement purposes by the smartphone.

SUMMARY

Advanced communication channels may be utilized between a television and a mobile device of a user, such as a smartphone or tablet, for example, via Bluetooth or acoustic connections. A user of the mobile device may have the ability to interact with a television to get more information related to content through feedback on the mobile device, via a separate communication channel to a content provider.

In one implementation, a smart television or other media device (e.g. set top box, computer, etc.) may use a wireless communication protocol to detect the presence or proximity of a mobile device. When a mobile device is detected, the media device can establish a communication link with the mobile device via the wireless communication protocol. When content is displayed by the media device, additional data can be sent to the mobile device to enhance the user experience via the communication link. The user can interact with the data sent to the mobile device or with the content itself by providing feedback on the mobile device. In some implementations, the user may select an option to download an app, view a map, open a web page, take a survey, purchase a product, express like/dislike of an advertisement, etc. In some implementations, the feedback provided by the user on the mobile device may be transmitted to the media device to prompt further data to be displayed on the mobile device or media device. In other implementations, the feedback may be provided to a content server via a second communication link, such as a cellular link or wireless link to the Internet. In some implementations, the user may modify content based on feedback on the mobile device.

These implementations are mentioned not to limit or define the scope of the disclosure, but to aid in understanding it. Particular implementations may be developed to realize one or more of the following advantages.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

Figure 1:
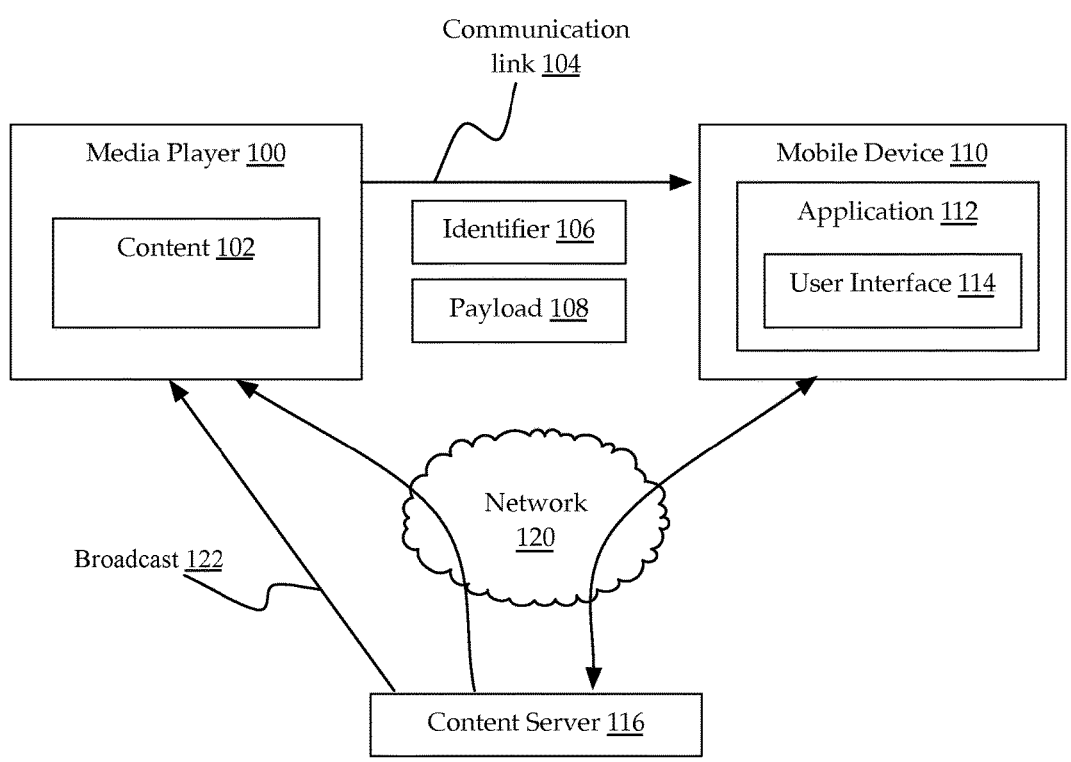
FIG. 1 is an illustration of an implementation of a system for providing interactions with content items.

Media or other content, referred to generally as content items, may be provided to client devices, including desktop computers, laptop computers, tablets or smart phones, video game consoles, smart televisions, wearable computers, or any other type and form of client device capable of presenting content to a user. The content may be of any type and form, including text, audio, video, interactive applications, games, or other media. In many implementations, content may be created by publishers, generally referred to as content providers; and may be delivered to client devices by content distribution systems having infrastructure and bandwidth for delivering the content to thousands or millions of client devices simultaneously. Such content distribution systems may include terrestrial, satellite, cellular, or broadband networks, and may include broadcast, multicast, or on-demand or unicast content.

To provide interactivity, some smart televisions or other devices allow direct interaction with content: for example, some content may be delivered with user-clickable banner advertising, interactive selections, etc. However, this method may not work for all devices, and may require specialized remote controls or other interfaces. In another implementation, a one way communication channel may be used with a mobile device of the user, such as a smart phone, tablet computer, wearable computer, or other such device to provide interaction. For example, a television advertisement may show a scannable code such as a QR code, and the user may use a camera of the mobile device to capture the code and load a corresponding website. However, such interaction cannot cause changes on the media device, and requires additional effort by the user.

Accordingly, in some implementations, advanced communication channels may be utilized between a television and a mobile device of a user, such as Bluetooth or acoustic connections. The communication may be two way, or may be one way and utilize a second communication channel (e.g. via the Internet to a content provider, and then via broadcast or unicast to the media device) for feedback or modification of content. Thus, a user of the mobile device may have the ability to interact with a television to get more information related to content through feedback on the mobile device, via a separate communication channel to a content provider.

In one implementation, a smart television or other media device (e.g. set top box, computer, etc.) may use a wireless communication protocol to detect the presence or proximity of a mobile device. When a mobile device is detected, the media device can establish a communication link with the mobile device via the wireless communication protocol. When content is displayed by the media device, additional data can be sent to the mobile device to enhance the user experience via the communication link. The user can interact with the data sent to the mobile device or with the content itself by providing feedback on the mobile device. In some implementations, the user may select an option to download an app, view a map, open a web page, take a survey, purchase a product, express like/dislike of an advertisement, etc. In some implementations, the feedback provided by the user on the mobile device may be transmitted to the media device to prompt further data to be displayed on the mobile device or media device. In other implementations, the feedback may be provided to a content server via a second communication link, such as a cellular link or wireless link to the Internet. In some implementations, the system may modify content based on feedback on the mobile device.

In one implementation, a media device may transmit an identifier of an application and a data payload. The transmission may be via Bluetooth, 802.11 (WiFi), Cellular, near field communication, Wireless universal serial bus (USB), optical interfaces including infrared or visible light, acoustic interfaces including audible or sub-audible signaling, including low frequency (e.g. below 20 Hz) or high frequency (e.g. above 16 kHz or above 20 kHz in some implementations) tones or noise bursts as well as psychoacoustically masked tones or noise bursts (e.g. in a similar frequency band after a high amplitude signal, etc.), or any other such method. An application handler on a mobile device may receive and recognize the identifier of the application. If the application is installed, the mobile device may execute the application; otherwise, the mobile device may request the application from an application store or server, install the application, and execute the application. The data payload may be provided to the application for execution to provide an interface for the user to interact with the content. For example, the payload may comprise a URL of a website associated with content displayed on the media device (e.g. a product page of an online store, an information page at an online encyclopedia, an online forum related to the content, etc.). In another implementation, the payload may comprise a set of instructions or markup language document (e.g. XML), such as text or icons to be rendered or displayed, links, buttons, or any other such data. In still another implementation, they payload may comprise binary data for the application, such as raw or compressed image or video data, encrypted communications, or any other such information. Accordingly, the user's mobile device may automatically display rendered content and/or an interactive interface when present when a media device displays related content.

Furthermore, the user may select interactive elements or provide feedback related to the content via the mobile device. The mobile device may establish a communication link to a content provider, either via the media device or via a separate connection (e.g. WiFi or cellular connection over the Internet), and provide indications of user feedback to the content provider. The content provider may dynamically modify content provided to the media device, or may select alternate content to provide to the media device based on the user feedback. For example, the content provider may recolor a product in an advertisement (e.g. changing a blue car to a green car) based on a user's feedback regarding favorite colors; or may provide additional content, such as a short documentary on the design of the car.

Various interactions that may be performed and/or content that may be provided in response may include a selection of an application or game to launch on a mobile device; directions to a nearby restaurant depicted in a broadcast advertisement; identification of nearby showtimes for a movie referenced in a broadcast trailer; coupons or purchase options for a product; saving, annotating, or sharing of content via a social network; survey information; product specifications; etc.

In one implementation, a lightweight signaling system may be used for communicating from the media device to the mobile device. For example, in one implementation, the media device may include a Bluetooth Low Energy (BTLE) beacon broadcasting a URL, opaque identifier, hash identifier, or any other such identification codes. In another implementation, the media device may include a sub-audible or ultrasonic speaker outputting a noise or tone burst comprising a hash identifier or URL. In still another implementation, the media device may comprise a WiFi access point broadcasting a hidden SSID set to a URL or hash identifier. The mobile device may receive the URL or hash identifier via a corresponding communication interface (e.g. Bluetooth, microphone, WiFi network interface, etc.). The mobile device may then transmit a request for a document at the identified URL via the same or a second communication interface (e.g. WiFi, cellular, etc.). In implementations using a hash identifier for signaling (which may require less bandwidth or data to be transmitted by the media device than a URL, particularly helpful for very limited communications paths such as SSID names, or audio tones or noise bursts), the mobile device may transmit a request comprising the hash identifier to a content provider. The content provider may respond with a corresponding data payload, binary data, web page, video or audio data, etc. In other implementations, the payload may be provided by the media device in the transmission to the mobile device (depending on payload size and bandwidth).

In a further implementation, to save bandwidth and/or avoid interference, the media device may only transmit the identifiers or enable the communication link to the mobile device upon detecting the presence of the mobile device. In some implementations, the media device and/or mobile device may periodically broadcast a presence request or identifier. The other device may receive the request or identifier and compare a received signal strength of the request or identifier to a predetermined threshold (e.g. a threshold in decibel milliwatts (dBm) for a BTLE or WiFi broadcast, a threshold in decibel sound pressure levels (dB SPL) for an audible or sub-audible tone or noise burst, etc.). If the request or identifier has a signal strength above the threshold, it may indicate that the media device and mobile device are in the same room or otherwise sufficiently close that the user of the mobile device may be consuming media from the media device. In a further implementation, the device may respond to the request or identifier with a similar broadcast identifier or response, such that the other broadcasting device may perform a similar signal strength measurement and comparison. Once the presence of the mobile device has been detected, the media device may enable the communication channel or establish a direct communication link with the mobile device (e.g. via a handshaking or synchronization algorithm, by enabling a BTLE beacon or WiFi SSID, etc.) or may otherwise begin providing the content identifications and/or hash identifiers via the communication channel. The presence detection algorithm may be periodically repeated. Upon detecting an absence of a mobile device (e.g. by not receiving a broadcast or response with a signal strength above the threshold), the media device may terminate the communication channel or link or otherwise cease providing content identifications and/or hash identifiers.

FIG. 1 is an illustration of an implementation of a system for providing interactions with content items. A media player 100 may communicate via a communication link 104 to a mobile device 110. The mobile device 110 may separately communicate with a content server 116 via a network 120. The content server 116 may provide one or more items of content 102 to the media player 100, and, in some implementations, directly to mobile device 110.

Still referring to FIG. 1 and in more detail, a media player 100 may comprise a smart television, set top box, cable box, video game console, desktop computer, laptop computer, server, smart appliance, tablet computer, A/V receiver, or any other type and form of media output device. Media player 100 may receive one or more items of content 102 from a content server 116 via a network interface to network 120, such as a digital subscriber link or broadband cable network connection or other packet switched network link; or may receive broadcast content 122 via a satellite dish or terrestrial broadcast antenna or similar means. In some implementations, media player 100 may receive content 102 via both networks 120, 122. Media player 100 may include an output for displaying content 102 such as a television screen, monitor, audio speaker or speakers, or other such features.

Content 102 may comprise any type and form of media content, including text, audio, video, animation, or other such content capable of output by media player 100. Content 102 may include program content and advertising or promotional content.

Media player 100 may receive an identifier 106 and, in some implementations, a data payload 108 from a content server 116 via network 120 or broadcast 122. In some implementations, the identifier may be provided in a blanking interval of a baseband signal, as part of closed captioning data, in metadata, or otherwise. Identifier 106 may comprise a URL, hash identifier, data string, or other identifier that may be provided to a mobile device 110 via a communication link 104, and subsequently provided by the mobile device 110 to the content server 116 as part of a request for content. Data payload 108 may comprise any type and form of data, including a URL, text string, image, video, audio, binary data, encrypted data, compressed data, interface configuration instructions including size and placement of buttons, or any other type and form of information. Although illustrated as transmitted via a communication link 104, in many implementations, mobile device 110 may receive an identifier 106 via the communication link 104 and may transmit a request for the payload 108 to content server 116 via network 120. Content server 116 may respond with the payload 108.

As discussed above, media player 100 may establish a communication link 104 with a mobile device 110. Communication link 104 may comprise a near field communication (NFC) link, a WiFi link or ad-hoc network, a wireless USB link, a Bluetooth link, or any other type and form of link. In some implementations, the communication link 104 may be unidirectional. For example, communication link 104 may include optical, infrared, or audible or sub-audible audio signals transmitted by the media player and received by the mobile device. In some implementations, such links 104 may not have any reverse communication path. Similarly, the link 104 may comprise a BTLE or WiFi SSID beacon broadcast comprising an identifier 106, and accordingly, no formal connection need be established by the mobile device to the media player 100 (e.g. no handshaking procedures may be performed, the mobile device 110 need not obtain an IP address or channel reservation, etc.).

As discussed above, in some implementations, media player 100 may only establish the communication link 104 responsive to detecting the presence of mobile device 110. In some implementations, the media player 100 and/or mobile device 110 may periodically broadcast a presence identifier or request. If this signal is received, the other device may measure the received signal strength and compare the result to a predetermined threshold to determine whether the devices are colocated or present in the same location or room. Similarly, in some implementations, one device may transmit a presence request and the other device may respond with an identifier, such that the first device may measure the received signal strength and determine presence. In some implementations, a device such as mobile device 110 may be configured to constantly monitor for a presence signal such as an audible or sub-audible (e.g. ultrasonic) watermark, or scan for BTLE beacons or WiFi SSID broadcasts with a predetermined value. In some such implementations, media player 100 may only establish a communication link 104 with a mobile device and/or transmit identifiers 106 or payloads 108 responsive to detecting presence of the mobile device. In other implementations, and particularly in implementations with no direct mobile device to media player return path, the media player 100 may broadcast identifiers 106 for all content 102 without determining whether a mobile device is present. For example, media player 100 may set a BTLE beacon or WiFi SSID to broadcast an identifier 106 for each item of content displayed by the media player 100, and any mobile device 110 in range may receive the identifier and perform other functions as necessary. In some such implementations, the mobile device 110 may measure the received signal strength of the identifier and may perform further actions only if the strength is above a predetermined threshold (such that the mobile device 110 may detect whether it is present and should perform further actions).

In some implementations, identifiers 106 and/or payloads 108 may be associated with blocks of content, such as television programs or segments or advertisements. In other implementations, identifiers 106 and/or payloads 108 may be further identified with a timestamp within the content 102. For example, in one such implementation, a manifest or list of identifiers 106 may be provided to a media player 100 with an item of content 102, with each identifier 106 associated with a timestamp. Upon reaching the corresponding timestamp during presentation of the item of content 102, the media player 100 may transmit the identifier 106 via communication link 104. Accordingly, identifiers 106 may be as temporally fine-grained as desired, such as identifiers of individual products within a longer program.

Mobile device 110, sometimes referred to as a user device or client device, may comprise a smart phone, tablet computer, laptop computer, wearable computer, or any other type and form of computing device capable of receiving an identifier 106 and/or payload 108 over a communication link 104 from a media player 100; for communicating via network 120 to a content server 116; and for executing an application 112 to render a user interface 114 to receive user interactions associated with content. As discussed in more detail below, a mobile device 110 may include a first communication interface for receiving an identifier 106 from a media player 100 and, in some implementations, for providing a presence indicator to media player 100. The first communication interface may comprise a Bluetooth interface, wireless USB interface, WiFi interface, cellular interface, NFC interface, optical interface, IR interface, or microphone and/or speaker of an audio interface, or any other type and form of communication interface. Similarly, a mobile device 110 may include a second communication interface for transmitting a request or interaction identifier to a content server 116, such as a cellular interface, WiFi interface, or any other such type of interface. First and second communication interfaces may be the same or different types of interfaces. In some implementations, the first and second communication interface may be the same interface, with different transport layer connections or performing different functions.

Mobile device 110 may execute an application 112. Application 112 may comprise any type and form of application, applet, service, daemon, or other executable logic. In some implementations, application 112 may comprise a portion of an operating system, while in other implementations, application 112 may comprise a web browser or other communications application. In some implementations, application 112 may be installed on mobile device 110 in advance. Upon receipt of identifier 106, mobile device 110 may determine that the identifier indicates the corresponding application 112, and may launch or execute the application (e.g. an identifier including an http:// URL may indicate to launch a web browser). In other implementations, application 112 may be downloaded by the mobile device 110 from a content server 116 or application store or provider, responsive to receipt of the identifier 106. For example, identifier 106 may include an application identifier code or name. The mobile device 110 may determine if application 112 is installed. If so, the mobile device 110 may execute the application; if not, the mobile device 110 may download the application from an application store, install the application, and execute the application. Mobile device 110 may receive payload 108 from the media player 100 and may buffer the payload or store the payload in a memory device. Once application 112 is downloaded and/or executed, mobile device 110 may retrieve the buffered payload and provide the payload to the application. In other implementations, mobile device 110 may receive identifier 106 and transmit the identifier 106 to a content server 116. Content server 116 may respond with a payload 108 and/or identification of the application 112. Mobile device 110 may similarly buffer the payload 108 and download and/or execute the application 112, and then provide the buffered payload to the application.

Application 112 may render a user interface 114 for allowing the user to interact with content. As discussed above, user interface 114 may include text, images, video, buttons, sliders, text entry interfaces, or any other type and form of interface. Interface 114 may comprise a web page, a survey, a shopping page, an informational page, or any other type and form of data.

Content server 116 may comprise a server, desktop computer, rackmount computer, server cloud, farm, data center, distributed data center, or any other type and form of computing device or devices. In some implementations, content server 116 may comprise one or more virtual machines executed by one or more physical machines. Content server 116 may provide content items 102 and identifiers 106 to a media player 100 via a network 120 and/or broadcast medium 122. Content server 116 may also provide data payloads 108 to a media player 100, or may provide data payloads 108 to a mobile device 110 via a network 120 in response to a request comprising a corresponding identifier 106. In some implementations, content server 116 or an application server (not illustrated) may provide an application 112 to a mobile device 110 for installation and execution in response to a request.

Network 120 may comprise any type and form of network, including a local area network (LAN), wide area network (WAN or the Internet), a cellular network, or any combination of these or other networks. Still referring to FIG. 2A and in more detail, network 205 may be any form of computer network or combinations of networks that relay information between client devices 210, one or more audience measurement servers 212, as well as other devices not illustrated. Network 205 may include the Internet and/or other types of data networks, such as a local area network (LAN), a wide area network (WAN), a cellular network, satellite network, or other types of data networks. Network 120 may also include any number of computing devices (e.g., computer, servers, routers, network switches, etc.) that are configured to receive and/or transmit data within network 120. Network 120 may further include any number of hardwired and/or wireless connections. A mobile device 110 may communicate wirelessly (e.g., via WiFi, cellular, radio, etc.) with a transceiver that is hardwired (e.g., via a fiber optic cable, a CAT5 cable, etc.) to other computing devices in network 120. In some implementations, a network 120 may be a virtual network, such as a virtual network between a plurality of virtual machines executed by a single physical machine, or a abstract network such as an offline transfer of data via physically movable media (e.g. a Sneakernet, transferring data via tape media, CD-ROM, flash media, external hard drives, floppy disks, etc.). Broadcast medium 122 may comprise any type and form of broadcast medium, including terrestrial and satellite broadcasts, broadcast cable networks, or other such mediums.

Figure 2:
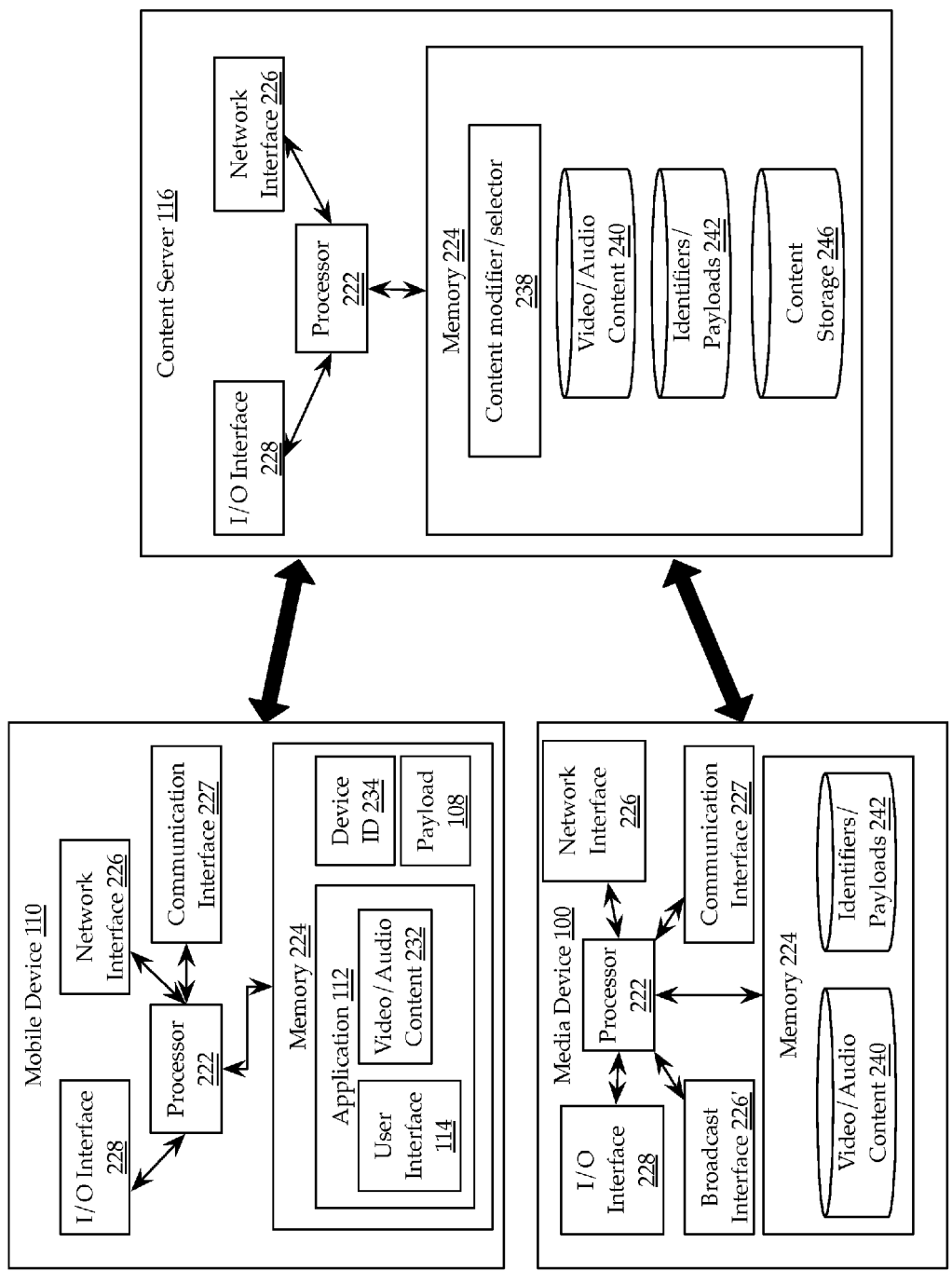
FIG. 2 is a block diagram of client, media, and content server devices, according to one implementation.

FIG. 2 is a block diagram of mobile, media, and content server devices, according to one implementation. As discussed above, a media device 100 and/or a mobile device 110 may be a desktop computer, laptop computer, tablet computer, smart phone, video game console, smart television or set top box, server, workstation, or any other type and form of computing device capable of communicating over a network.

In many implementations, a media device 100 and/or mobile device 110 may include a processor 222 and a memory 224. Memory 224 may store machine instructions that, when executed by processor 222 cause processor 222 to perform one or more of the operations described herein. Processor 222 may include a microprocessor, ASIC, FPGA, etc., or combinations thereof. In many implementations, processor 222 may be a multi-core processor or an array of processors. Memory 224 may include, but is not limited to, electronic, optical, magnetic, or any other storage devices capable of providing processor 222 with program instructions. Memory 224 may include a floppy disk, CD-ROM, DVD, magnetic disk, memory chip, ROM, RAM, EEPROM, EPROM, flash memory, optical media, or any other suitable memory from which processor 222 can read instructions. The instructions may include code from any suitable computer programming language such as, but not limited to, C, C++, C#, Java, JavaScript, Perl, HTML, XML, Python and Visual Basic.

A media device 100 and/or mobile device 110 may include one or more network interfaces 226 and/or a broadcast interface 226'. A network interface 226 may include any type and form of interface, including Ethernet including 10 Base T, 100 Base T, or 1000 Base T ("Gigabit"); any of the varieties of 802.11 wireless, such as 802.11a, 802.11b, 802.11g, 802.11n, or 802.11ac; cellular, including CDMA, LTE, 3G, or 4G cellular; Bluetooth or other short range wireless connections; or any combination of these or other interfaces for communicating with a network 205. In many implementations, client device 210 may include a plurality of network interfaces 226 of different types, allowing for connections to a variety of networks 205 or a network 205 such as the Internet via different sub-networks.

In implementations in which a client device is a smart television or set top box, the client device may receive content via a first broadcast interface 226', such as a terrestrial, satellite, or cable broadcast; and may communicate with a mobile device or content server via a second network interface 226 via network 120, such as an Ethernet or WiFi interface. In other implementations, media device may receive content via network 122 and may transmit identifications of interactions via network 120. Accordingly, network interface 226 may comprise an Ethernet network interface, an 802.11 network interface, or any other type and form of switched interface, and broadcast interface 226' may comprise an analog or digital coaxial interface, a broadband cable interface, etc., and may include one or more amplifiers and antennas or receiving dishes.

As discussed above, a media device 100 and/or mobile device 110 may include one or more communications interfaces 227. A communications interface 227 may comprise any type and form of communications interface for communicating between media device 100 and mobile device 110. In some implementations, the networking established by communications interface 227 may be unidirectional, bidirectional, peer to peer, ad hoc, or of any other format or type. Communications interface 227 may be similar to a network interface 226 or may be a network interface 226. In other implementations, communications interface 227 may be a Bluetooth interface and/or BTLE beacon, NFC interface and/or beacon, WiFi SSID beacon, optical, infrared, ultrasonic, or other such interface, as discussed above.

A media device 100 and/or mobile device 110 may include one or more user interface devices 228. A user interface device 228 may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interface devices may be internal to the housing of a media device 100 and/or mobile device 110, such as a built-in display, touch screen, microphone, etc., or external to the housing of the media device 100 and/or mobile device 110, such as a monitor connected to the device, a speaker connected to the device, etc., according to various implementations.

A media device 100 and/or mobile device 110 may include in memory 224 an application 112 or may execute an application 112 with a processor 222. In some implementations, a media device 100 may execute an application, service, server, daemon, routine, or other executable logic for communicating over a network, such as a web browser, mail client, video player, music player, video game, or any other such application. Such applications may include a command line interface, graphical user interface, or any combination of these or other interfaces. Application 112 may be an application, applet, script, service, daemon, routine, or other executable logic for receiving content and for transmitting responses, commands, or other data. In one implementation, application 112 may be a web browser, while in another implementation, application 112 may be a video game. Application 112 may include functionality for displaying content received via network interface 226 and/or generated locally by processor 222, and for transmitting interactions received via a user interface device 228, such as requests for websites, selections of survey response options, input text strings, etc. Application 112 may be a media player or include an embedded media player, such as a plug-in or native media player within a web browser. Application 112 may provide user interfaces for interacting with content played in the media player, such as a skip control, dislike button, or any similar interface.

In some implementations, application 112 may include a data collector or collection agent. A collection agent may include an application plug-in, application extension, subroutine, browser toolbar, daemon, or other executable logic for collecting data processed by application. In other implementations, a collection agent may be a separate application, service, daemon, routine, or other executable logic separate from application 112 but configured for intercepting and/or collecting data processed by application, such as a screen scraper, packet interceptor, API hooking process, or other such application. A collection agent may be configured for intercepting or receiving data input via user interface device 228, such as Internet search queries, text strings, survey response selections, or other values, or data received and processed by application 112 including websites visited, time spent interacting with a website or application, pages read, or other such data. In many implementations, a collection may store some or all of this data or identifiers of such data in a behavior history database or other data structure, and may include identifications of websites visited, web links followed, search queries entered, or other such data. In some implementations, the data may be anonymized or disambiguated to reduce personally identifiable information. In other implementations, the collection agent may be executed by a server, or by an intermediary device deployed between the client and server, such as a router, cable modem, or other such device. Data requests and responses may be parsed by a collection agent executing on an intermediary router as the requests and responses traverse the router. In some implementations, this may allow for monitoring of all data flow to/from a household, without requiring installation of the collection agent on a plurality of devices within the household. In other implementations, a media device 100 and/or mobile device 110 may not execute a collection agent; in such implementations, request data may be obtained by an audience measurement server without the use of a collection agent, such as via embedded images in rendered content, redirected requests, or other such methods.

A media device 100 and/or a mobile device 110 may include or be identified with a device identifier 234. Device identifier 234 may be an alphanumeric string, data string, serial number, media access control (MAC) address, internet protocol (IP) address, username or account name, globally unique identifier (GUID), cookie, random or pseudorandom number, or any other type and form of identifier, including combinations of these or other identifiers. In some implementations, the device identifier 234 may be fixed to the device or preconfigured in the device, such as a manufacturer serial number or MAC address, while in other implementations, the device identifier 234 may be dynamically set by a content provider, panel provider, audience measurement server, application 112, or other entity, such as a cookie or username. In some implementations, a unique or new device identifier 234 may be set for each communication to a content provider and/or audience measurement server, while in other implementations, the device identifier 234 may not be changed, or may be changed periodically (e.g. hourly, daily, weekly, etc.) or at other intervals (e.g. on restart of the client device, login to an internet service, etc.). In some implementations, a device identifier 234 may be associated with one or more other device identifiers 234 (e.g., a device identifier for a mobile device, a device identifier for a home computer, etc.). In many implementations, as discussed above, a device identifier 234 may be generated and/or transmitted to the device 210 by a content provider. In other implementations, as discussed above, client 210 may request a device identifier or cookie 234 from an audience measurement server or content provider, and may transmit the device identifier or cookie 234 to the audience measurement server provider or content provider in association with requests for content.

A media device 100 and/or a mobile device 110 may include video/audio content 232, 240, which may be stored in a memory 224. Audio/video content 232, 240 may be received from a content server 116 via a network 120, 122, as discussed above, and may be buffered, stored, or cached in memory 224 and/or provided to an I/O interface 228. Memory 224 may also store identifiers and payloads as discussed above. In some implementations, memory 224 may store a database or manifest of identifiers and/or payloads 242 for broadcasting or transmission based on related content or at identified timestamps.

Also illustrated in FIG. 2 is a block diagram of an implementation of a content provider 116, broadcast provider, or similar device. As with media device 100 and mobile device 110, server 116 may include one or more processors 222, memories 224, network interfaces 226, and user interfaces 228. In some implementations referred to as headless servers, a server 116 may not include a user interface 228, but may communicate with clients with user interfaces 228 via a network. Memory 224 may include content storage, such as storage of webpages, images, audio files, video files, data files, or any other type and form of data. In some implementations, memory 224 may store one or more applications (not illustrated) for execution by processor 222 of the server, including FTP servers, web servers, mail servers, file sharing servers, peer to peer servers, or other such applications for delivering content stored in content storage.

A content server 116 may include one or more computing devices connected to a network and configured for providing content to a media device and/or mobile device, either directly or via an audience interaction system or content distribution system. Content server 116 may be referred to variously as a content provider, server, web server, data server, publisher, service provider, or by other similar terms. In many implementations, content provider 116 may include a plurality of computing devices configured as a server farm or cloud, and may include routers, load balancers, network address translators, firewalls, or other such devices. Content providers 116 may be computer servers (e.g., FTP servers, file sharing servers, web servers, etc.) or combinations of servers (e.g., data centers, cloud computing platforms, etc.). Content providers 116 may provide any type and form of content, including text, images, video, audio, multimedia, or other data, or any combination of these. Content may include search results, blog or forum content, news articles, movies, television shows, podcasts, video games or other interactive content, advertising in any format, websites, social media, or any other type and form of content. Content provider 116 may be an online search engine that provides search result data to mobile devices in response to a search query. In another implementation, content provider 116 may be a first-party web server that provides webpage data to mobile devices in response to a request for the webpage.

Server 116 may also maintain content storage 246, which may store any type and form of content including audio or video content as discussed above. In some implementations, content storage 246 may be in one or more external storage devices, or may be distributed across one or more servers 116 or cloud storage devices. Content from content storage 246 may be provided to media devices and/or mobile devices.

Server 116 may execute a content modifier/selector 238. A content selector 238 may comprise an application, service, daemon, server, or other executable logic for selecting items of content from content storage 246 based on an interaction received from a mobile device 110. In other implementations, content modifier 238 may comprise an application, service, daemon, server, or other executable logic for modifying items of content from content storage based on an interaction received from a mobile device. Content modifier/selector 238 may be part of the same application or routine. Content selector/modifier may select different content based on an interaction (such as an interaction indicating a user preference for one product over another) and/or may modify content based on an interaction (such as recoloring a blue car to green based on a user preference for one color over another). Accordingly, content modifier/selector 238 may include routines for editing audio, video, still images, and/or text, including language parsing, recolorizing, keying, dynamic replacement of labeled content, or other such features.

Figure 3:
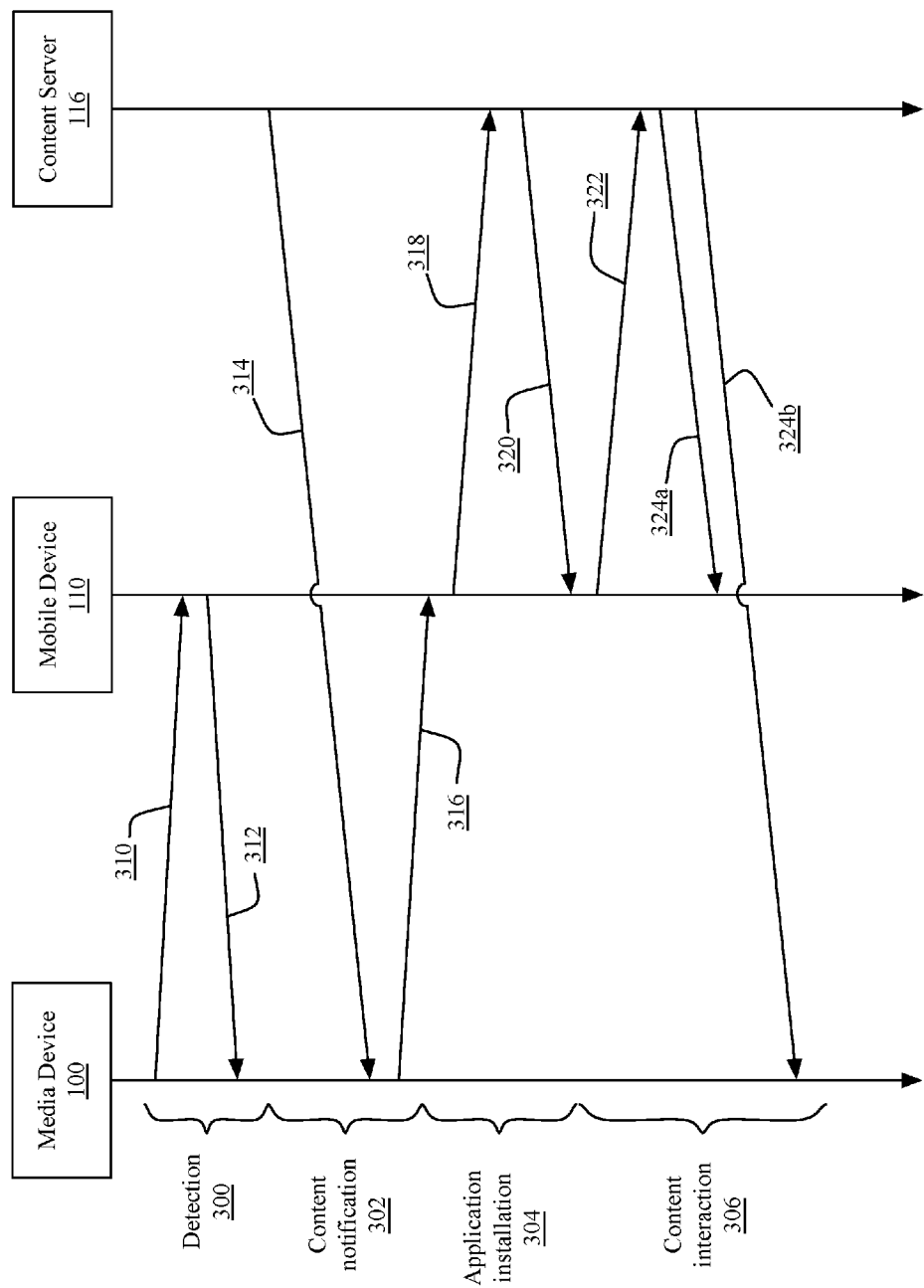
FIG. 3 is a signal flow or swim lane chart illustrating a method of providing interactions with content items, according to one implementation.

FIG. 3 is a signal flow or swim lane chart illustrating a method of providing interactions with content items, according to one implementation. Lines are not shown to scale, and may comprise only a few bytes or several megabytes or gigabytes. Accordingly, some signal transmissions may be very quick, while others may consume a significant amount of time. Thus, the chart of FIG. 3 should be utilized for orders of signal flow, rather than explicit timing of flows.

During a first detection stage 300, in some implementations, a media player 100 may broadcast a detection or presence signal 310 via a first communication interface. If the mobile device 110 is nearby and receives the broadcast, in some implementations, the mobile device 110 may compare the received signal strength of the broadcast signal 310 to a predetermined threshold. If the received signal strength is above the threshold, then in some implementations, the mobile device may transmit an identifier 312 to the media player 100. The identifier 312 may include a device identifier of the mobile device 110 and, in some implementations, may be transmitted as part of a handshaking or connection establishment process. Accordingly, in some implementations, additional signals may be transmitted between the media player and mobile device (e.g. SYN, SYN-ACK, ACK signals, or other such signals). Although shown initiated by media player 100, in some implementations, mobile device 110 may initiate presence detection and may transmit broadcast 310. Media device 100 may respond with identifier 312. In still other implementations, as discussed above, the communication channel between media device 100 and mobile device 110 may be unilateral. In such implementations, mobile device may not respond with signal 312. Detection stage 300 may be repeated periodically in some implementations. In other implementations, detection stage 300 may be skipped.

During a content notification stage 302, a content server 116 may transmit content and/or a content identifier 314 to a media device via a second communication interface. As discussed above, in some implementations, content identifiers 314 may be provided in advance, as with a manifest comprising timestamps or temporal identifications of when content identifiers should be provided to mobile devices. Content server 116 may also provide content to media device 100, which may be displayed or output by media device 100. Media device 100 may also broadcast or transmit a content identifier 316 to a mobile device 110 via the first communication interface. In some implementations, media device may also transmit a data payload for buffering and providing to an application by mobile device.

During an application installation stage 304, upon receipt of the content identifier 316, the mobile device 110 may determine if an appropriate application is installed. If so, the mobile device 110 may execute the application, and skip to a content interaction stage 306. If not, the mobile device 110 may transmit a request 318 to a content server 116. The request 318 may include the identifier 316, a device identifier, an application identifier, or any other such information. Content server 116 or an application server (not illustrated) may transmit an application 320 to mobile device 110 for installation. In other implementations, such as where operations are performed by a preinstalled operating system or web browser of the mobile device 110, application installation phase 304 may be skipped.

In a similar implementation, an identifier 316 may not provide sufficient details to identify an application or payload data, but may be simply an identifier or hash result. Mobile device 110 may transmit a request (as with request 318) to a content server 116 including the identifier or hash result, and, in some implementations, a device identifier of the mobile device 110 or other such information. Content server 116 may transmit a response 320 with more details of the content identifier, such as an application identifier, URL, data payload, or other such information. In a further implementation, this exchange may be performed before and in addition to application installation as discussed above.

During a content interaction phase 306, the mobile device 110 may render a user interface based on the data payload received from the media device with identification 316 or from the content server with response 320. The user interface may include questions, buttons, surveys, selectors, or other such user-interactive elements. Upon selection of one or more interface elements by a user, the mobile device 110 may transmit a request 322 to a content server 116, such as an HTTP GET or POST request, a remote application programming interface (API) call or remote procedure call (RPC), or any other such function. The request 322 may comprise an identifier 316, a device identifier, and an interaction identifier (e.g. identification of a selected button, a value of a slider, etc.). As discussed above, content server 116 may select a second item of content and/or modify the content based on the interaction, and may transmit the second item of content 324a, 324b to mobile device 110 and/or media device 100. For example, based on a user selection of a preferred color, content server 116 may recolorize an advertisement, and provide the advertisement to a media device for display to the user. Accordingly, in some implementations, the selected or modified item of content may be provided to media device 100 via a network 120 or broadcast network 122.

In some implementations, responsive to receipt of the identification of the interaction and/or responsive to transmission of the second item of content, the content server and/or a measurement server may record the device identifier of the mobile device and/or media device and the identification of the first and/or second items of content as part of a user audience measurement log. Interaction with the interface may indicate that the user is engaged with the first and/or second content items, which may be important information to advertisers, producers, or content providers.

Figure 4:
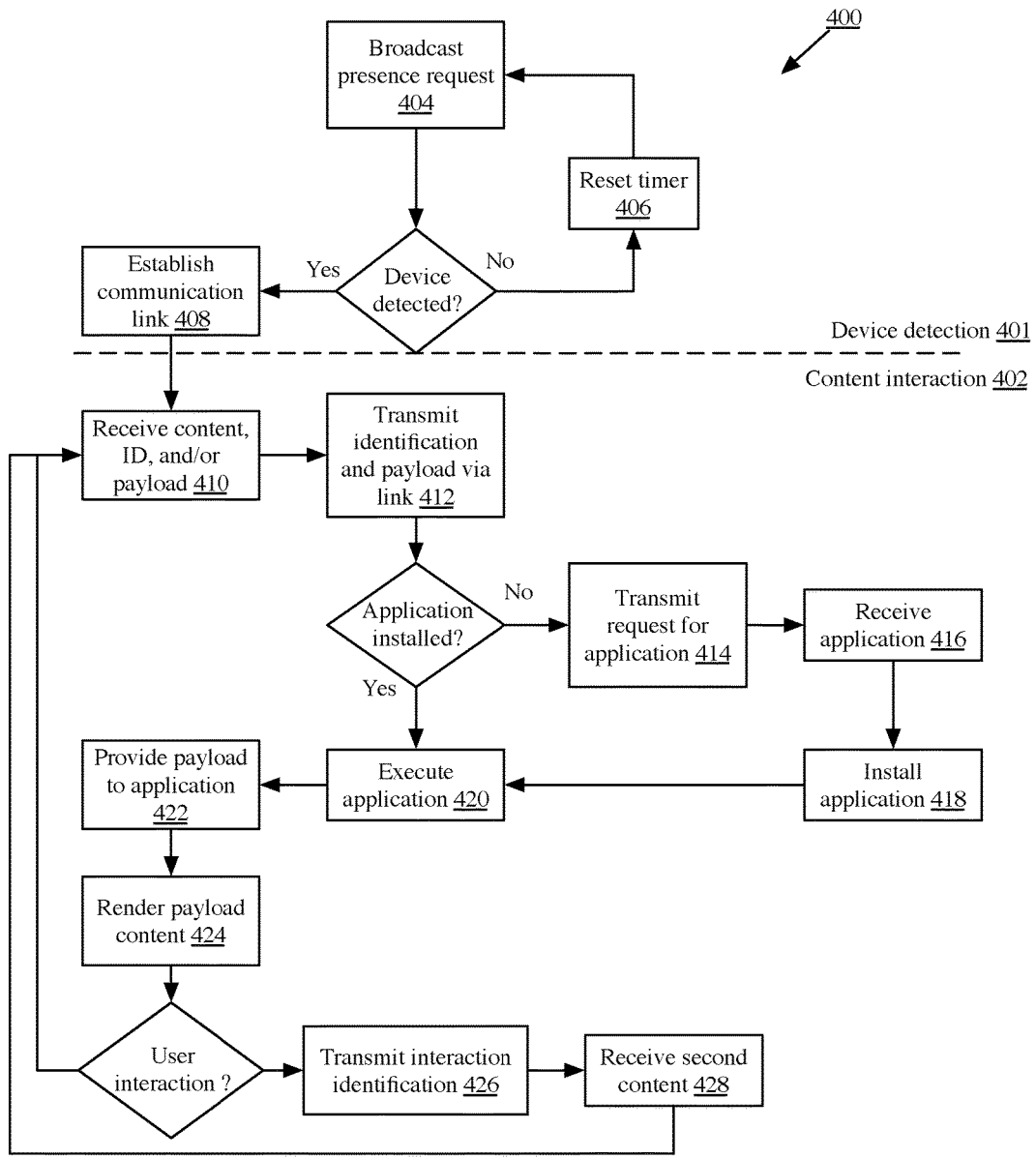
FIG. 4 is a flow chart of an implementation of a method for providing interactive content.

FIG. 4 is a flow chart of an implementation of a method 400 for providing interactive content. During a first device detection phase 401, a media device and/or a mobile device may broadcast a presence request or indicator at step 404. The broadcast may be via a first communication interface, limited to a broadcast range (e.g. Bluetooth, NFC, Wireless USB, WiFi, ultrasonic, optical, infrared, or any similarly limited interface). The other device, if present, may receive the signal. To detect if the device is in proximity, a received signal strength of the broadcast signal may be compared to a threshold. If the received signal strength does not exceed the threshold, then the receipt may be a false positive (e.g. received through a wall, even though the mobile device and user is not in the same location as the media device). Accordingly, at step 406 in some implementations, the device may reset a broadcast timer. Expiration of the timer may be used to periodically rebroadcast the identifier. If the received signal strength does exceed the threshold, then at step 408 in some implementations, a communication link may be established between the media device and mobile device using the first communication interface. In some implementations, establishing the link may comprise exchanging communications parameters or configuration (e.g. synchronization values, window sizes, timing values, etc.). In other implementations, as discussed above, the link may be unidirectional, and/or device detection may be skipped (e.g. the media device may always broadcast content identifiers via the first communication interface to any mobile device able to receive them). In such implementations, the mobile devices may still perform signal strength comparisons as discussed above to filter false positives.

In the content interaction phase 402, at step 410, the media device may receive an item of content, a content identifier, and, in some implementations, a payload from a content provider. As discussed above, in some implementations, the media device may receive the item of content, content identifier, and/or payload in advance, such as in a manifest.

The media device may display the item of content. Responsive to displaying the content, and/or responsive to a timestamp within the content corresponding to a content identifier in a manifest, at step 412, the media device may transmit a content identifier, and, in some implementations, an application identifier and/or a payload, to the mobile device via the communication link or via the first communication interface. In other implementations, the application identifier and/or payload may be retrieved separately from a content server as discussed above.

In some implementations in which an application identifier is sent to the mobile device, the mobile device may determine if the application is installed. If not, then at step 414, the mobile device may transmit a request for the application to a content provider and/or application provider or store via the second communication interface. At step 416, the mobile device may download or receive the application from the store. At step 418, the mobile device may install the application. At step 420 or if the mobile device determines the application is already installed, the mobile device may execute the application.

As discussed above, in some implementations, only the content identifier may be provided via the communication link to the mobile device. The mobile device may transmit a request for the corresponding application identifier and data payload to the content provider, as discussed above. Steps 414-420 may be performed after receipt of the application identifier from the content provider.

At step 422, the mobile device may provide the payload to the application. As discussed above, the payload may be received from the media device via the first communication interface or from the content provider via the second communication interface, and may be buffered until the application is executing and prepared to render the user interface.

At step 424, the application may render the payload content. Rendering the payload content may include generating and rendering a user interface on a display of the mobile device.

If a user interaction with the user interface is received, then at step 426, the mobile device may transmit an identification of the interaction to the content server. The identification may comprise a parameter value pair of an HTTP GET or POST request, a remote procedure call, or any other type of notification. A content selector/modifier of the content server may select and/or modify content based on the identification of the interaction and provide the selected and/or modified content to the media device and/or mobile device, which may receive and display the content at step 428. The content server may also record or direct an audience measurement server to record the device identifier of the mobile device in association with the first item of content and/or the second item of content as an audience member.

Steps 410-428 may be iteratively repeated for additional items of content. Similarly, steps 404-408 may be periodically repeated to ensure the mobile device is still present, detect other mobile devices, and/or detect when the mobile device (and user) depart.

In one aspect, the present disclosure is directed to a method for interacting with a first item of content. The method includes detecting, by a mobile device via a first communication interface, that the mobile device is within a predetermined distance of a media device. The method also includes establishing a communication link between the media device and the mobile device via the first communication interface, responsive to the detection. The method further includes receiving, by the mobile device from the media device via the communication link, an identification of an application and a data payload related to a first item of content provided to a user by the media device. The method also includes executing, by the mobile device, the application responsive to receipt of the identification. The method further includes rendering, by the application, a user interface based on the data payload. The method also includes detecting, by the application, an interaction with the user interface. The method also includes transmitting, by the mobile device via a second communication interface, a request to a content server comprising an identification of the detected interaction, the content server providing a second item of content to the media device selected based on the detected interaction.

In some implementations, the method includes storing, by the mobile device, the received data payload; transmitting, by the mobile device to an application server, a request for the identified application; and receiving, by the mobile device, the application from the application server. In a further implementation, the method includes installing, by the mobile device, the application on the mobile device.

In some implementations, the method includes receiving, by the mobile device via the first communication interface, communications setup information from the media device. In other implementations, the method includes measuring, by the media device, a signal strength of a wireless communication signal received from the mobile device via the first communication interface. In still other implementations, the method includes transmitting a confirmation to a measurement server that the first item of content was provided to the user, responsive to detecting that the mobile device is within the predetermined distance of the media device. In some implementations, the data payload comprises a uniform resource locator (URL). In other implementations, the data payload comprises an executable set of instructions to render the user interface.

In another aspect, the present disclosure is directed to a system for interacting with a first item of content. The system includes a mobile device comprising a first communication interface and a second communication interface, a memory device. The system also includes a processor configured to: detect, via the first communication interface, that the mobile device is within a predetermined distance of a media device; establish a communication link with the media device via the first communication interface, responsive to the detection; receive, from the media device via the communication link, an identification of an application and a data payload related to a first item of content provided to a user by the media device; execute the application responsive to receipt of the identification, the application configured to render a user interface based on the data payload and detect an interaction with the user interface; and transmit, via the second communication interface, a request to a content server comprising an identification of the detected interaction, the content server providing a second item of content to the media device selected based on the detected interaction.

In some implementations of the system, the processor of the mobile device is further configured to: store the received data payload in the memory device; transmit, to an application server via the second communication interface, a request for the identified application; receive the application from the application server; and store the application in the memory device for execution. In a further implementation, the processor of the mobile device is further configured to install the application on the mobile device.

In some implementations, the processor of the mobile device is further configured to receive communications setup information from the media device via the first communication interface. In other implementations, the processor of the mobile device is further configured to measure a signal strength of a wireless communication signal received from the mobile device via the first communication interface; and the detection that the mobile device is within the predetermined distance of the media device is responsive to the measured signal strength being above a predetermined threshold.

In some implementations, the processor of the mobile device is further configured to transmit, via the second communication interface, a confirmation to a measurement server that the first item of content was provided to the user, responsive to the detection.

In still another aspect, the present disclosure is directed to a method for providing interaction with a first item of content. The method includes detecting, by a media device via a first communication interface, that a mobile device is within a predetermined distance of the media device. The method also includes establishing, by the media device, a communication link with the mobile device via the first communication interface. The method further includes receiving, by the media device from a content server, a first item of content, an identification of an application, and a data payload. The method also includes displaying, by the media device, the first item of content; and transmitting, by the media device to the mobile device via the communication link, the identification of the application and the data payload. The method also includes receiving, by the media device from a content server, a second item of content, the second item of content selected responsive to an interaction of a user of the mobile device with the application, executed by the mobile device responsive to the transmission of the application and the data payload; and displaying, by the media device, the second item of content.

In some implementations of the method, transmitting the identification of the application and the data payload cause the mobile device to transmit, to an application server, a request for the identified application; and receive the application from the application server.

In some implementations, the method includes providing, by the media device, communications setup information to the mobile device. In other implementations, detecting that the mobile device is within the predetermined distance of the media device comprises measuring, by the media device, a signal strength of a wireless communication signal received from the mobile device. In still other implementations, the method includes transmitting a confirmation to a measurement server that the first item of content was provided to the user, responsive to detecting that the mobile device is within the predetermined distance of the media device. In a further implementation, the method includes transmitting a confirmation to the measurement server that the second item of content was provided to the user.

As discussed above, in many such implementations, collected data may be anonymized or disambiguated to protect the privacy, particularly for individuals that are not panel participants. In many such implementations or similar situations in which personal information about the user of client device may be collected for measurement or used to select third-party content, the user may be provided with an opportunity to control whether programs or features that may collect personal information (e.g., information about a user's social network, social actions or activities, a user's preferences, or a user's current location) do so, or an opportunity to control whether or how to transmit measurement data to an audience measurement server and/or panel provider. In addition, certain data may be treated in one or more ways before it is stored or used by an audience measurement server, so that personally identifiable information is removed when generating parameters (e.g., demographic parameters). A user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by the audience measurement servers, and content providers.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, such as a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magnetooptical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including semiconductor memory devices, e.g., EPROM, EEPROM, and flash memory devices; magnetic disks, e.g., internal hard disks or removable disks; magnetooptical disks; and CDROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; by sending webpages to a web browser on a user's client device in response to requests received from the web browser.

Implementations of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Communication networks may include a local area network ("LAN") and a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method for interacting with a first item of content, comprising:
   detecting, by a mobile device via a first communication interface, that the mobile device is within a predetermined distance of a media device;
   establishing a first communication link directly between the media device and the mobile device via the first communication interface, responsive to the detection;
   receiving, by the mobile device from the media device via the direct first communication link, an identification of an application and a data payload related to a first item of content provided to a user by the media device;
   executing, by the mobile device, the application responsive to receipt of the identification;
   rendering, by the application, a user interface based on the data payload;

detecting, by the application, an interaction with the user interface;

establishing, by the mobile device, a second communication link between the mobile device and a content server via a second communication interface, responsive to receiving the data payload from the media device, the second communication link distinct from the first communication link; and transmitting, by the mobile device via the second communication link, a request to the content server comprising an identification of the detected interaction to cause the content server to provide a second item of content to the media device via a third communication link directly between the content server and the media device, the second item of content selected based on the detected interaction.

2. The method of claim 1, wherein executing the application further comprises:

storing, by the mobile device, the received data payload;

transmitting, by the mobile device to an application server, a request for the identified application; and receiving, by the mobile device, the application from the application server.

3. The method of claim 2, further comprising installing, by the mobile device, the application on the mobile device.

4. The method of claim 1, wherein establishing the communication link comprises receiving, by the mobile device via the first communication interface, communications setup information from the media device.

5. The method of claim 1, wherein detecting that the mobile device is within the predetermined distance of the media device comprises measuring, by the mobile device, a signal strength of a wireless communication signal received from the media device via the first communication interface.

6. The method of claim 1, further comprising transmitting a confirmation to a measurement server that the first item of content was provided to the user, responsive to detecting that the mobile device is within the predetermined distance of the media device.

7. The method of claim 1, wherein the data payload comprises a uniform resource locator (URL).

8. The method of claim 1, wherein the data payload comprises an executable set of instructions to render the user interface.

9. A system for interacting with a first item of content, comprising:

a mobile device comprising a first communication interface and a second communication interface, a memory device, and a processor configured to:

detect, via the first communication interface, that the mobile device is within a predetermined distance of a media device, establish a first communication link directly between the mobile device and the media device via the first communication interface, responsive to the detection, receive, from the media device via the direct first communication link, an identification of an application and a data payload related to a first item of content provided to a user by the media device, execute the application responsive to receipt of the identification, the application configured to render a user interface based on the data payload and detect an interaction with the user interface, and establish a second communication link between the mobile device and a content server via the second communication interface, responsive to receiving the data payload from the media device, the second communication link distinct from the first communication link, and transmit, via the second communication link, a request to the content server comprising an identification of the detected interaction to cause the content server to provide a second item of content to the media device via a third communication link directly between the content server and the media device, the second item of content selected based on the detected interaction.

10. The system of claim 9, wherein the processor of the mobile device is further configured to:

store the received data payload in the memory device, transmit, to an application server via the second communication interface, a request for the identified application, receive the application from the application server, and store the application in the memory device for execution.

11. The system of claim 10, wherein the processor of the mobile device is further configured to install the application on the mobile device.

12. The system of claim 9, wherein the processor of the mobile device is further configured to receive communications setup information from the media device via the first communication interface.

13. The system of claim 9, wherein the processor of the mobile device is further configured to measure a signal strength of a wireless communication signal received from the media device via the first communication interface; and wherein the detection that the mobile device is within the predetermined distance of the media device is responsive to the measured signal strength being above a predetermined threshold.

14. The system of claim 9, wherein the processor of the mobile device is further configured to transmit, via the second communication interface, a confirmation to a measurement server that the first item of content was provided to the user, responsive to the detection.

15. A method for providing interaction with a first item of content, comprising:

detecting, by a media device via a first communication interface, that a mobile device is within a predetermined distance of the media device;

establishing, by the media device, a first communication link directly between the media device and the mobile device via the first communication interface;

receiving, by the media device from a content server, a first item of content, an identification of an application, and a data payload;

displaying, by the media device, the first item of content;

transmitting, by the media device to the mobile device via the direct first communication link, the identification of the application and the data payload, the mobile device establishing a second communication link between the mobile device and a content server via a second communication interface, responsive to the mobile device receiving the data payload from the media device, the second communication link distinct from the first communication link;

receiving, by the media device from the content server via a third communication link directly between the content server and the media device, a second item of content, the second item of content selected responsive to a request transmitted to the content server from the mobile device via the second communication link, the request comprising an identification of an interaction of a user of the mobile device with the application, executed by the mobile device responsive to the transmission of the application and the data payload; and displaying, by the media device, the second item of content.

16. The method of claim 15, wherein transmitting the identification of the application and the data payload cause the mobile device to transmit, to an application server, a request for the identified application; and receive the application from the application server.

17. The method of claim 15, wherein establishing the communication link comprises providing, by the media device, communications setup information to the mobile device.

18. The method of claim 15, wherein detecting that the mobile device is within the predetermined distance of the media device comprises measuring, by the media device, a signal strength of a wireless communication signal received from the mobile device.

19. The method of claim 15, further comprising transmitting a confirmation to a measurement server that the first item of content was provided to the user, responsive to detecting that the mobile device is within the predetermined distance of the media device.

20. The method of claim 19, further comprising transmitting a confirmation to the measurement server that the second item of content was provided to the user.

* * * * *